United States Patent [19]

Hemmerich et al.

[11] 4,431,488

[45] Feb. 14, 1984

[54] HEAT ABSORBER STRUCTURE, PARTICULARLY A PLASMA BEAM ABSORBER AND METHOD OF MANUFACTURING THE STRUCTURE

[75] Inventors: Johann Hemmerich; Peter Kupschus, both of Juelich; Helmut Fraenkle, Unterhaching, all of Fed. Rep. of Germany

[73] Assignee: Messerschmitt-Bölkow Blohm GmbH & Kernforschungsanlage Jülich GmbH, Fed. Rep. of Germany

[21] Appl. No.: 427,275

[22] Filed: Sep. 29, 1982

Related U.S. Application Data

[62] Division of Ser. No. 243,763, Mar. 16, 1981.

[30] Foreign Application Priority Data

Mar. 24, 1980 [DE] Fed. Rep. of Germany ....... 3011282

[51] Int. Cl.³ .......................... C25D 1/02; C25D 5/02
[52] U.S. Cl. ........................................... 204/9; 204/16
[58] Field of Search ............................. 204/9, 16, 3, 4

[56] References Cited

U.S. PATENT DOCUMENTS

| 3,595,025 | 7/1971 | Stockel | 204/9 |
| 3,768,256 | 10/1973 | Butter | 204/9 |
| 3,835,644 | 9/1974 | Butter | 204/9 |
| 3,897,316 | 7/1975 | Huang | 204/16 |
| 4,285,779 | 8/1981 | Shiga | 204/9 |

Primary Examiner—T. M. Tufariello
Attorney, Agent, or Firm—McGlew and Tuttle

[57] ABSTRACT

A heat absorber structure comprises a first wall of a good heat conducting material which has a surface with a plurality of spaced apart web portions with coolant channels defined between the web portions and a second wall of a good conducting material overlying the first wall and secured to at least portions of the web portions of the first wall. A second wall has a plurality of bulge portions formed therein in locations overlying the coolant channels. With the method of the invention the coolant channels are filled with an electrically conductive wax which is heated while the second wall is constrained in certain areas so as to form bulge portions on the second wall overlying the channels.

7 Claims, 5 Drawing Figures

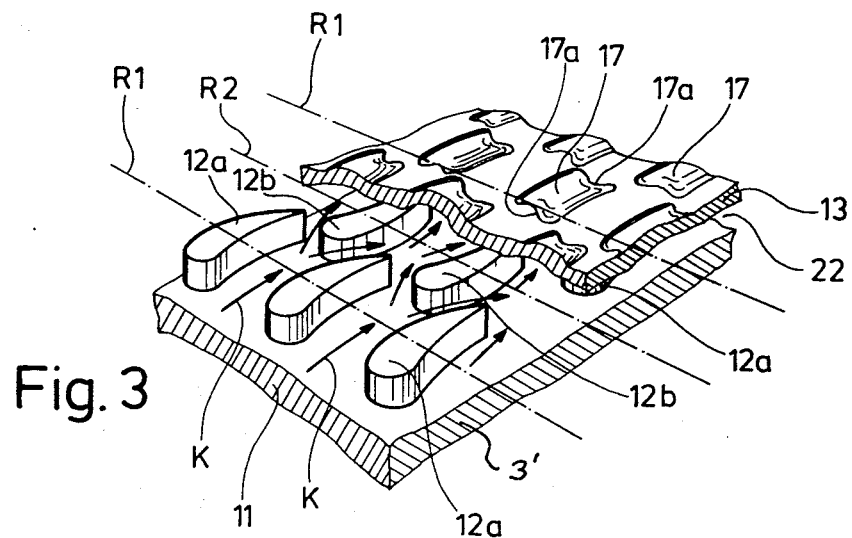
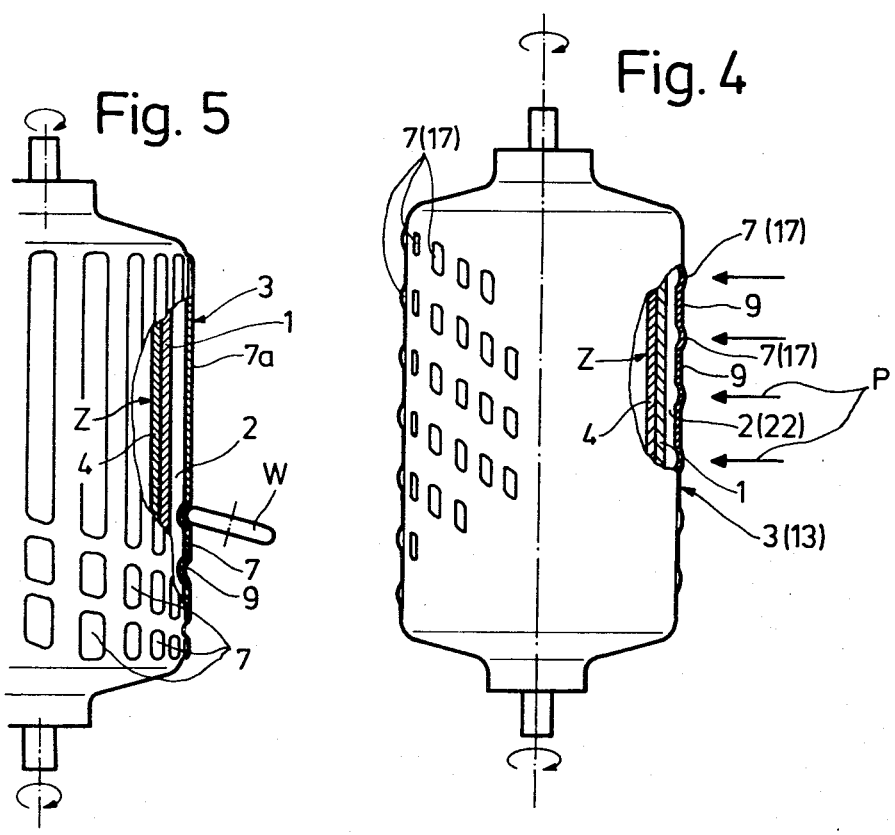

HEAT ABSORBER STRUCTURE, PARTICULARLY A PLASMA BEAM ABSORBER AND METHOD OF MANUFACTURING THE STRUCTURE

This is a division of application of Ser. No. 243,763 filed Mar. 16, 1981.

FIELD AND BACKGROUND OF THE INVENTION

This invention relates in general to the construction of a heat absorber structure or heat exchanger particularly for plasma beam absorbers and thrust engines which includes a first wall which has a plurality of channels in an outer face thereof and a second wall which is electrodeposited on the first wall and overlies the channels and is provided with bulge areas at spaced locations along its length.

U.S. Pat. No. 3,595,025 and German patent 1,751,691 disclose rock combustion chambers substantially comprising a basic structure or inner wall of a material well conducting heat, particularly copper, with longitudinal cooling channels milled therein which are covered by an electroplated outer wall also of a well conducting material particularly copper. To obtain this structure, the milled channels are filled with an electrically conducting wax, whereupon the outer wall is deposited by electroplating and the wax is melted out.

During operation of the rocket, a cryogenic propellant component is conducted through the channels to remove the produced heat, so that the inner wall of the combustion chamber is intensely cooled and, at the same time, the propellant component is thermally conditioned or vaporized prior to being introduced into the head of the combustion chamber. Therefore, high thermal stresses are produced during operation of the rocket in the inner wall which is reinforced and stiffened by its web and therefore, in bond with the outer wall, has a high section modulus, thus is highly resistant to warping. While in rocket combustion chambers, what is wanted is to absorb and remove, substantially uniformly over the entire housing, a great amount of heat with a decreasing temperature gradient toward the thrust nozzle and a relatively cooler zone at the head of the combustion chamber where evaporative cooling prevails, the problem dealt with in the inventive solution is that the concerned heat absorbers are primarily exposed to local thermal loads. A plasma beam absorber, for example, has to endure extreme local beam shocks leading to great thermal expansions.

SUMMARY OF THE INVENTION

The invention is directed to a heat absorber which is so designed that the unavoidable stresses caused by extreme local heating and the expansion resulting therefrom can be taken up or "handled" by the absorber without suffering damages.

To this end, and in accordance with the invention, the outer wall is provided in the area above and along the cooling channels, in the direction of the extension, with a plurality of alternate individual bulges and lands along its length.

The invention makes sure that the outer wall of the structure which is directly and locally exposed to the effect of extreme heat can expand bidirectionally, in both the longitudinal and transverse directions or along it length and circumference, and eventually also in its thickness, thus three-dimensionally in practice, without self-destruction, so that its internal stresses are relieved and damages are eliminated.

To advance the intended effect, this inventive basic pattern can be improved by providing that bulge and land formations are staggered or offset in longitudinal and/or transverse or circumferential directions.

The relaxation of internal strains is thereby facilitated or made possible also obliquely to the two main longitudinal and circumferential directions.

In accordance with the method of the invention a wax is applied into the coolant channels of the first wall and the second wall is formed over the inner wall by electroplating. Thereafter the outer wall is constrained in areas in which the outer wall is to maintain lands the wax is heated so as to form bulges between the lands. The bulges are advantageously formed over the cooling channel so as to improve the heat transfer characteristics over the channels. This is accomplished in a simple way by a multiple wire winding applied over the exterior wall with the successive turns spaced from each other. The wall is then subjected to pressure such as by heat produced by the melting out of the wax which expands more than the metal of the inner wall and the outer wall so as to form the bulge of the areas of the outer wall which are not constrained by the wire.

After the melting out of the wax the continuous protuberance strips or bulges which are formed between the wire coils are flatened out again in zones which are preferable to be provided with lands such as those overlying the webs between the coolant channels. This may be accomplished for example by applying rollers under pressure along an oblique track around the exterior wall.

Instead of a continuous web formation of the inner wall, the inner wall may be provided with projections forming securing bodies which are spaced from each other and arranged in rows extending transversely to the flow direction of the coolant in a cooling channel. The outer wall is formed by electroplating over these securing bodies or web portions as in the other methods.

In this design, the securing bodies may be arranged in such a pattern that they project by their forward and rear ends into the interspaces between the other securing bodies. The pattern of the bulges located apart may thus be so diversified that in addition to the larger bulges, depressions relative to the initial surface are produced at the ends of the securing bodies in the interspace between the securing bodies of the individual rows, so that further variations of the configuration are obtained.

In a preferred method of the invention after the outer wall is electroplated over the inner wall, wax arranged in the cooling channels is heated so that the wax expands more than the metal of the inner and outer walls and bulges are produced in the statically weaker outer walls during the melting out of the wax.

To improve the flow conditions and increase the degree of heat exchange at the same time, it is provided, in accordance with a further feature of the invention, to give the individual securing bodies a streamlined shape.

Due to a structuring of the outer wall as explained above, by means of the individual securing bodies and their localization relative to each other, the outer wall is prepared for, or made capable of, overcoming the occurring heat attack without destruction and in a particularly advantageous way, since substantially equal geometric or superficial conditions of expansion are given in all directions, preventing stress peaks, so that the life is decidedly extended.

The inventive absorber may, primarily, be used for capturing plasma beams in fusion reactors. To prevent an overheating of the structure, in this extreme application, it is provided to place the inventive wall structure on a rotary support so that the highly heated zone of the wall hit by the plasma beam is periodically rotated out of the range of attack and has time to "recover" during the following period of a full revolution, i.e., to cool down, with the heat being removed by the circulating coolant.

Accordingly, it is an object of the invention to provide a heat absorber structure which comprises a first wall of a good heat conducting material which has a surface with a plurality of spaced apart webbed portions defining coolant channels therebetween, and a second wall of good conductor matering which overlies the first wall and is secured to at least some of the webbed portions and has a plurality of bulge portions formed therein in locations overlying the cooling channels.

A further object of the invention is to provide a method of forming a heat absorber structure which comprises forming a first wall of good heat conductor material with spaced apart web portions having coolant channels therebetween, filling the cooling channels with electrically conductive wax, forming a second wall by electroplating it onto the first wall and bonding it to the first wall at least at some of the web portions, and heating the wax to remove it from the channels while constraining a part of the exterior of the second wall to form bulges in the second wall overlying the coolant channels.

A further object of the invention is to provide a heat absorber structure which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 3 is a partial top perspective view of a plasma beam absorber structure of another embodiment of the invention;

FIG. 4 is a cylindrical plasma beam absorber partly in section of another embodiment of the invention; and FIG. 5 is a view similar to FIG. 4 showing another manner of forming the plasma beam absorber.

DESCRIPTION OF THE PREFERRED EMBODIMENTS

Figure 1:
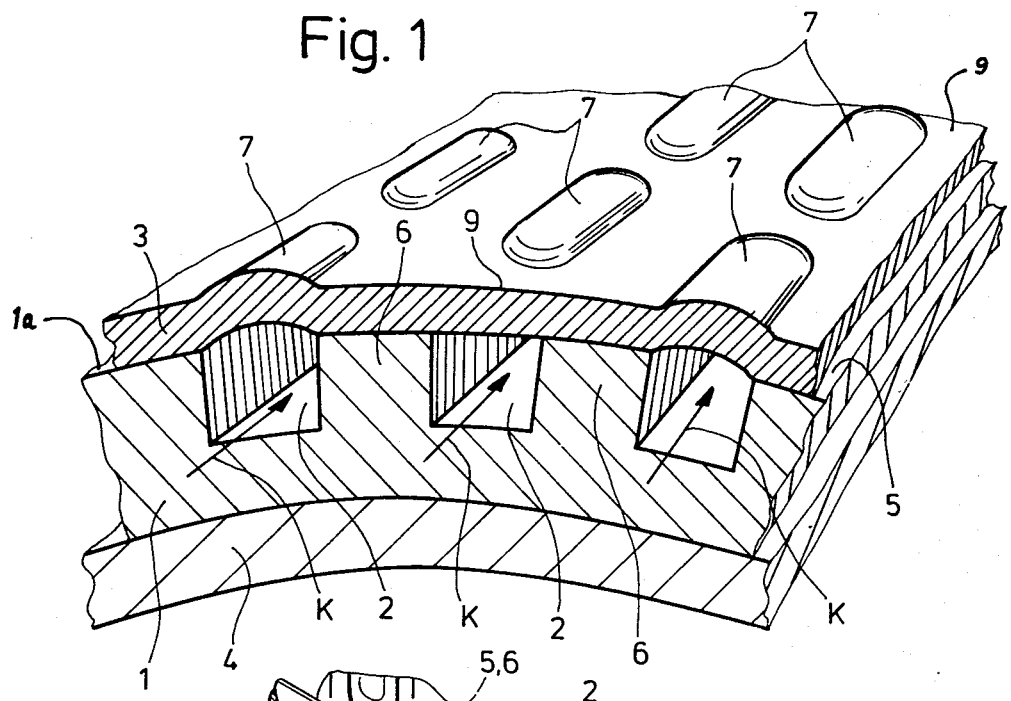
FIG. 1 is a partial perspective sectional view of a thrust engine having walls constructed in accordance with the invention.
Figure 2:
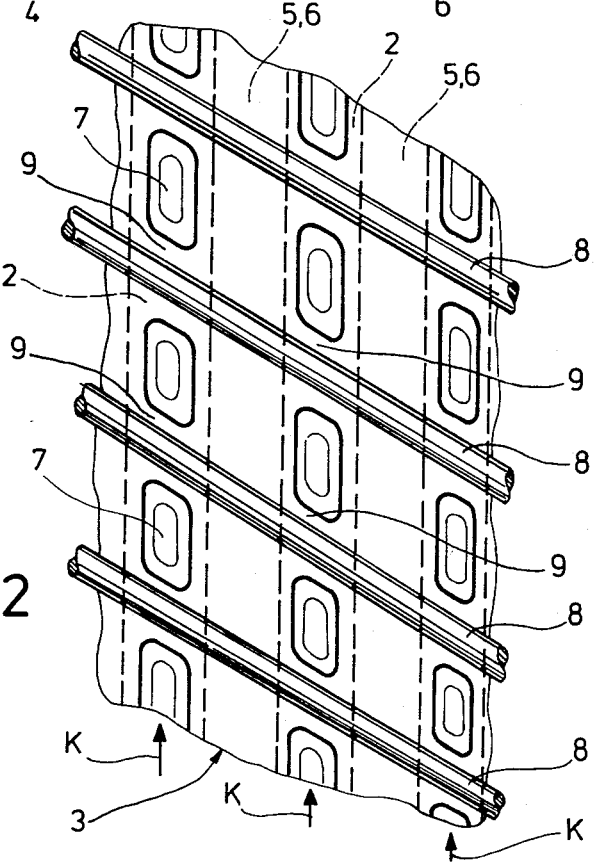
FIG. 2 is a partial top plan view of the outer wall structure shown in FIG. 1.

Referring to the drawings in particular, the invention embodied therein, FIG. 1 comprises a thrust engine which has a portion of its heat absorber wall structure shown and which includes the first wall or inner wall 1 which is made of a good conducting material which has a surface 1a with a plurality of spaced apart web portions 6 with coolant channels 2 disposed therebetween. In the embodiment illustrated, the wall structure is cylindrical and after filling the coolant channels with a electrically conductive wax a second wall or outer wall 3 is electroplated to the inner wall 1 and bonded preferably at least over the web portion 6.

In accordance with the invention the outer wall 3 in the areas where it overlies the cooling channels 2 is provided with a plurality of bulges 7 leaving lands 9 therebetween so as to prove its characteristics in respect to heat transfer in stability and long life.

In an outer face 12 of an inner wall 1 of a material well conducting heat, particularly copper, continuous cooling channels 2 are provided, more particularly worked in. The channels 2 are first filled with an electrically conducting wax (not shown), in order to permit the deposition by electroplating of an outer wall 3. The outer wall 3 also of copper is then applied in an electroplating process that in the cylindrical basic form of this wall shown in FIG. 1, outer wall 3 is initially also cylindrical on its entire circumferential surface, and may be concentric to the inner wall 1 and a basic inner wall or supporting wall 4.

Due to the electroplating, outer wall 3 adheres by its inside surface firmly to the radially outwardly projecting securing faces 5 of web portions 6.

For the reasons explained above, outer wall 3 is to be provided with bulges 7. This may be done, for example, by tightly winding a wire, in turns 8 around the outer wall 3.

The still cylindrical outer wall 3 with the wax confined in cooling channels 2 is heated so that, since the wax expands more than the inner and outer walls 1 and 3 made of metal, particularly copper, the outer wall 3 becomes protuberant in the areas between the wire turns 8, and individual bulged strips 7 are formed, between which lands 9 remain due to the pressure of the wire winding 8.

According to FIG. 3, an inner wall 3' is provided with streamlined securing bodies or web formations 12a, 12b which are arranged in rows R1 and R2, with the securing bodies 12a of row R1 being staggered relative to securing bodies 12b of rows R2 in such a position that the front and rear ends of securing bodies 12a or 12b, considered in the flow direction of the coolant K, project into the interspaces of the adjacent row. To bulge an outer wall 13, again the wax is left in the cooling channel system between the individual securing bodies 12a, 12b after the accomplished electroplating, and the entire structure is heated. Since the wax expands more than the metal of the outer and inner walls 13,14, bulges 17 are produced between the individual securing bodies 12a, 12b of each row R1, R2, which, considering the entire surface, merge into each other and produce depressions 17a relative to the initial bulge surface in the end zones of the individual securing bodies 12a, 12b so that a continuous system of elevations and depressions is produced over the entire surface, practically completely satisfying the purpose aimed at removing stresses.

According to FIG. 4, the inventive wall structure is provided on a cylinder Z mounted for rotation. The heat radiation, particularly plasma beams is indicated at P.

FIG. 5 illustrates the principle according to which the final shape of the individual bulges 7 is obtained by means of an embossing tool such as a roller W. As shown, the still continuous bulged strip, or outer wall, 7a earlier produced by expanding the wax, extends above roller W, while below roller W, the final shape of outer wall 3 is indicated. Roller W travels along a helical path around the cylindrical workpiece (absorber) to make bulges such as that shown at 17 in FIG. 4. The cooling channels thus produced are shown at 2 and 22 which may be produced for any one of the embodiments shown in the configuration desired or any combustion thereof.

While specific embodiments of the invention have been shown and described in detail to illustrate the application of the principles of the invention, it will be understood that the invention may be embodied otherwise without departing from such principles.

What is claimed is:

1. A method of forming a heat absorber structure comprising forming a first wall with good heat conducting material at spaced apart web portions leaving cooling channels between said web portions, filling the cooling channels with an electrically conductive wax, forming a second wall by electroplating it over the first wall and bonding it to the first wall at least at some the said web portions, and heating the wax to remove the channels while constraining a part of the exterior of the second wall to form bulges in the second wall overlying the cooling channels between the constrained parts.

2. The method according to claim 1, wherein the web portions extend longitudinally along the length of said first and second wall portions and wherein the bulges are made in spaced relation one after the other above the cooling channels with the bulges adjacent channels being staggered.

3. A method according to claim 1, wherein the second wall is constrained by applying a wire winding therearound.

4. A method according to claim 1, wherein the wax is melted so as to cause the bulging of the second wall while it is constrained and after the bulges are formed flatening portions of the bulges thereof by applying a roller under pressure thereto along an oblique track.

5. A method according to claim 1, wherein the inner wall web portions comprise individual securing bodies formed on the exterior of said first wall arranged in rows extending transversely to the flow direction in the cooling channels defined therebetween, and after depositing the outer wall by electroplating applying a pressure to the second wall in the areas overlying the cooling channels to produce the bulges.

6. A method according to claim 5, wherein the securing bodies are formed so that their ends project into the spaces between the rows forming the cooling channels and they are made of a streamlined confirguration.

7. A method according to claim 1, wherein the wall structure is made in the form of a hollow cylinder which is mounted for rotation.

* * * * *